July 8, 1958 A. W. ECKSTROM ET AL 2,842,195
APPARATUS FOR SEPARATING LIQUID FROM VAPOR
IN AN EVAPORATOR OR THE LIKE
Filed June 24, 1954 3 Sheets-Sheet 1
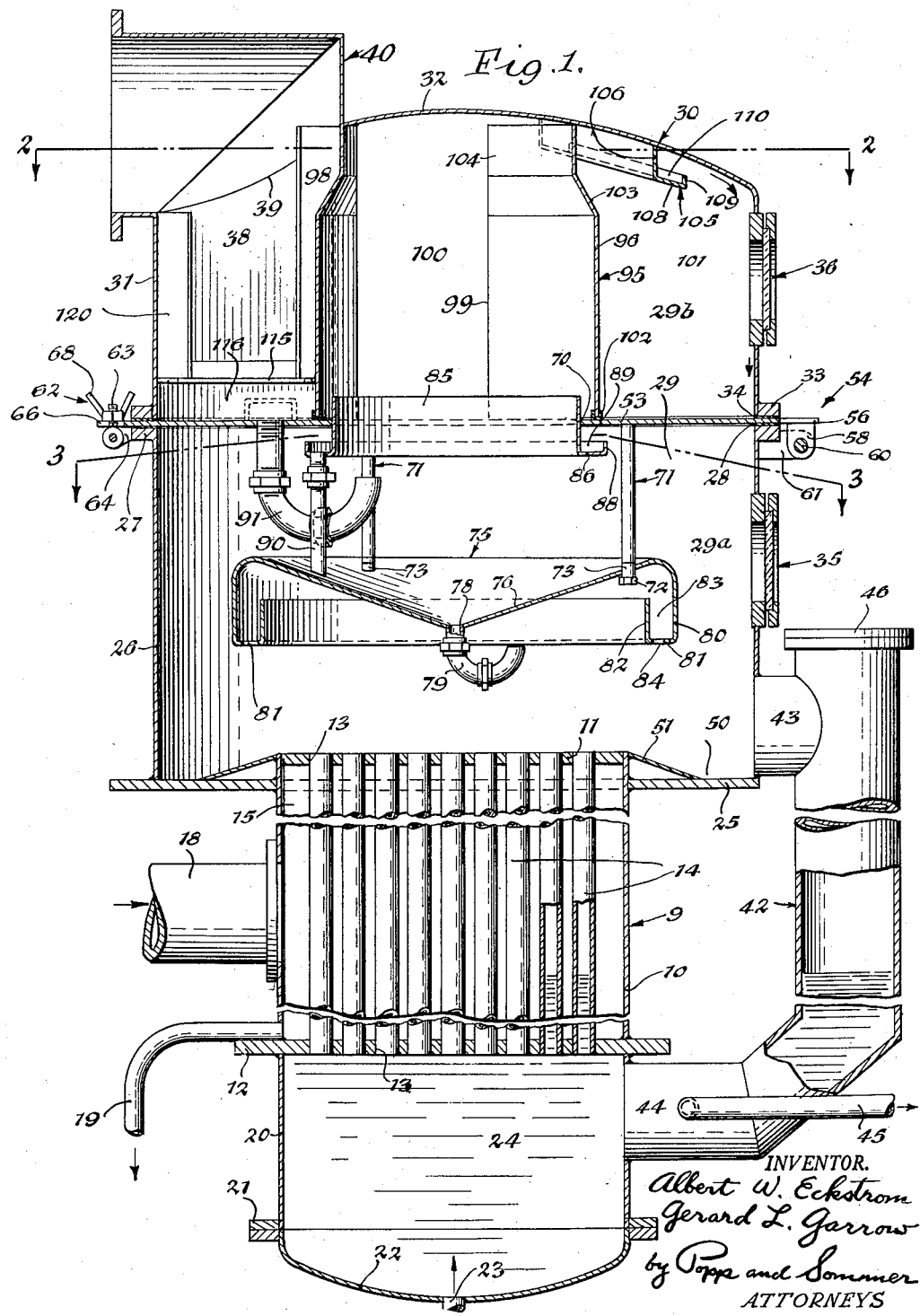
INVENTOR.
Albert W. Eckstrom
Gerard L. Garrow
by Popp and Sommer
ATTORNEYS

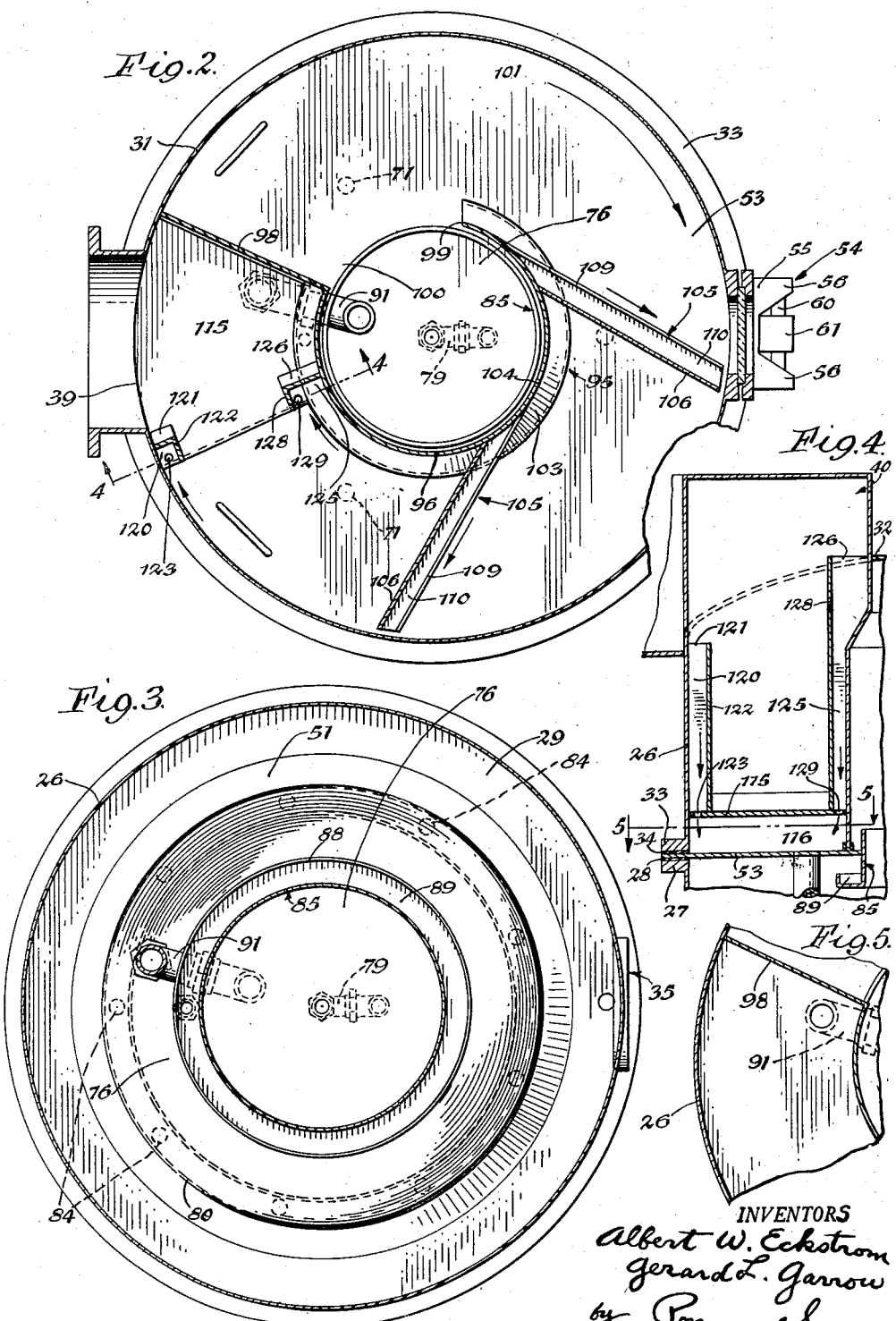

United States Patent Office

2,842,195
APPARATUS FOR SEPARATING LIQUID FROM VAPOR IN AN EVAPORATOR OR THE LIKE

Albert W. Eckstrom, Buffalo, and Gerard L. Garrow, Cheektowaga, N. Y., assignors to Blaw-Knox Company, Pittsburgh, Pa., a corporation of Delaware Application June 24, 1954, Serial No. 439,079

2 Claims. (Cl. 159—31)

This invention relates to apparatus for separating liquid from the vapor leaving an evaporator or the like, and more particularly to such separating apparatus which is mounted in the vapor space or dome constituting the upper part of the evaporator so as to avoid the necessity of providing a separate vapor-liquid separator alongside the evaporator.

This application is an improvement on the co-pending application of Albert W. Eckstrom for improvements in the same type of apparatus and filed December 22, 1952 under Serial No. 327,338 and now Patent 2,718,215.

In common with the said prior application, one of the objects of the present invention is to provide such a vapor-liquid separator which can be mounted in the vapor space or dome at the top of an evaporator and at the same time have the ability of effectively separating the entrained liquid from a stream of vapor passing at high velocity through the vapor space and in which the separator returns the separated liquid to the evaporator.

Another important object of the invention is to provide such a vapor-liquid separator which is readily accessible for cleaning the same.

Another important object of the invention is to render the operation of the evaporator more steady and uniform, particularly as it concerns the recirculation of the liquid in the evaporator and maintaining a uniform level thereof in the tubes of the evaporator.

Another object of the present invention is to provide such a vapor separator which, following separation of the liquid from the vapor, maintains the separation of the liquid from the stream of vapor and avoids re-entry of the separated liquid into the vapor stream.

Another object is to provide a separator in which the liquid separated from the vapor is returned downwardly, but not in the form of a more or less continuous curtain through which the vapor must break, but in the form of distinct heavy streams or drops which provide among them a large free area through which the vapor can pass at high velocity.

Another object is to avoid a condition where the stream of vapor passes an edge of a liquid carrying surface and along which edge the stream or vapor causes feathering and abstraction of the liquid, that is, attenuation of the liquid into a streamer or extension from this edge and carrying off of such attenuated extension or streamer of liquid by the vapor stream.

Another object is to provide such a vapor-liquid separator which is of very compact and effective construction.

Another object is to avoid caking and burning of heat sensitive materials on exposed heated surfaces in the vapor chamber.

Other objects and advantages of the invention will be apparent from the following description and drawings in which:

Fig. 1 is a fragmentary vertical longitudinal section through an evaporator equipped with a vapor-liquid separator embodying one form of the present invention.

Figs. 2 and 3 are horizontal sections taken on the correspondingly numbered lines of Fig. 1.

Fig. 4 is a fragmentary vertical section taken on line 4—4, Fig. 2.

Fig. 5 is a fragmentary horizontal section taken on line 5—5, Fig. 4.

Figure 6:
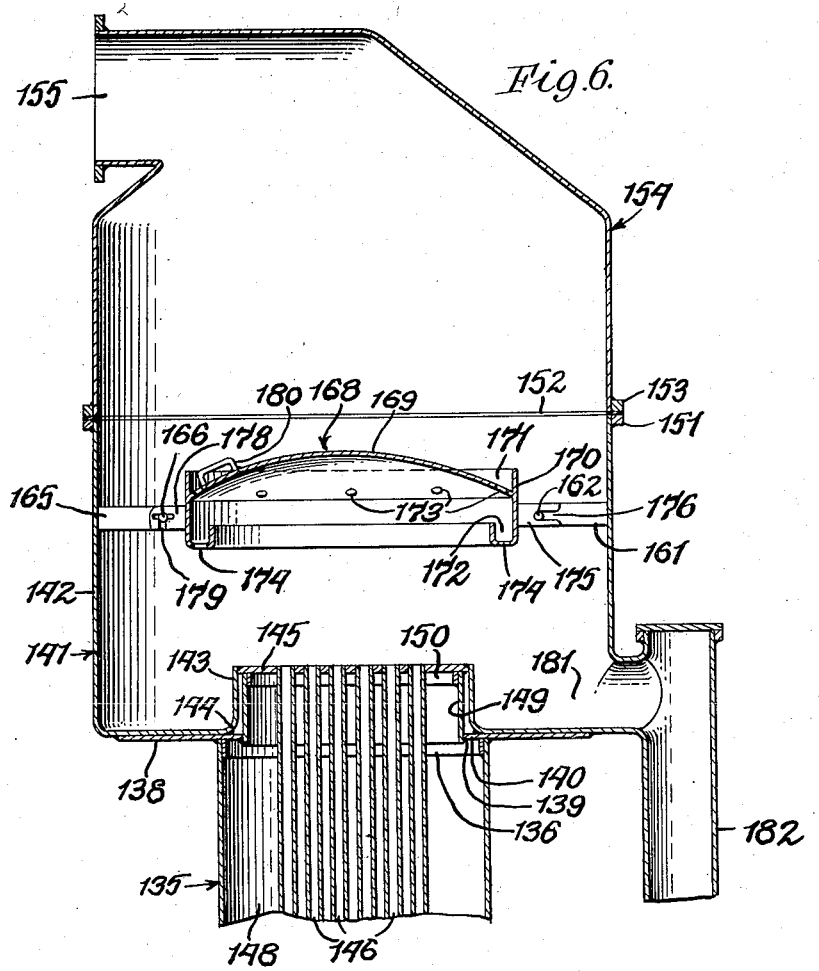
Fig. 6 is a diagrammatic view similar to Fig. 1 and illustrating a modified form of the invention.

In the accompanying drawings a single evaporator is shown, although it will be understood that several of such evaporators can be connected so as to provide a multiple effect evaporator. In the evaporator shown the numeral 9 generally designates the vertical tubular shell of the evaporator having a cylindrical wall 10 which is shown as having its upper end welded to an upper tube sheet 11 and shown as having its lower end welded to a lower tube sheet 12, these tube sheets extending across the interior of the shell at the extremities thereof and the rim of the lower tube sheet 12 being shown as projecting beyond the shell 10. These tube sheets are provided with a plurality of openings 13 which are in register with one another and in which the ends of vertical tubes 14 are inserted and secured, as by expanding the tubes in place. The space around these tubes 14 and bounded by the cylindrical wall 10 and tube sheets 11, 12, constitute a steam space or chest 15. Steam is admitted to the steam space or chest 15 through a steam inlet 18 and the condensate can be removed from a condensate outlet 19.

To the lower face of the lower tube sheet 12 is welded a vertical cylinder 20 the lower end of which is shown as being outwardly flanged as indicated at 21. To this flange is removably secured a dished bottom 22 having an inlet 23 for the liquid to be concentrated. The vertical cylinder 20, its bottom 22 and the lower tube sheet 12 define a chamber 24 containing the liquid being processed.

A slight distance below the upper extremity of the shell 10 and below the level of the tube sheet 11 which forms the upper face of this shell, a metal ring 25 is welded to the periphery of the shell 10 to project radially outwardly therefrom in a horizontal plane.

A vertical cylinder 26 is welded to the periphery of this ring 25 to extend upwardly therefrom and an outwardly projecting flange ring 27 is welded around the upper rim of this cylinder 26. This flange ring 27 is provided in its upper face supporting a circular sealing gasket 28 of soft resilient material. This cylinder 26 forms, with the upper tube sheet 11 and ring 25, the upper vapor space 29 of the evaporator and this vapor space 29 is completed by a cover 30. It will also be seen that the cylinder 26, ring 25 and cylinder 10 form a shell constituting a part of the steam chest and vapor space of the evaporator. This cover is shown as being in the form of a dome having a vertical cylindrical side wall 31 and an upwardly dished top wall 32. At its lower end a flange ring 33 is welded to project radially outwardly from the side wall 31. An annular sealing gasket 34 of soft resilient material is arranged against the under side of this flange 33 and is arranged above the sealing gasket 28 of the shell of the evaporator. The cylindrical side walls 26 and 31 of the vapor separator can be provided with observation glasses or windows 35, 36.

The vapors from the vapor space 29 escape through an opening 38 provided in the top wall 32 of the cover 30 near one side thereof. To the edge of this opening is welded, as indicated at 39, one end of a vapor outlet elbow 40, the discharge end of which is preferably directed horizontally as shown.

Liquid from the vapor space 29 is returned to the liquid chamber 24 at the bottom of the evaporator through a return leg 42. The upper end of this return leg is connected by a lateral branch 43 with the vapor space 29 immediately above the ring 25 and the lower part of this return leg is connected by a laterally extending branch 44 with the liquid chamber 24 at the bottom of the evaporator. An outlet line 45 for the concentrated liquid can be provided at the bottom of the return leg 42 and this return leg can also have a clean out door 46 at its upper end.

A feature of the invention resides in the projection of the shell 10 above the ring 25 so as to provide an annular trough 50 in the bottom of the vapor chamber 29 which is depressed with reference to the tube sheet 11 and through which trough the liquid projected upwardly from the tubes 14 flows in returning through the return leg 42 to the liquid chamber 24. Without the provision of the depressed trough 50 around the tube sheet 11 a body of liquid would soon form on the top of the tube sheet 11 through which body the mixture of liquid-vapor leaving the tubes 14 would be required to pass. This would increase the resistance in the tubes and also cause additional liquid to break away from this body and form additional free drops of liquid. This additional resistance formed by such a body of liquid on top of the tube sheet 11 would be variable and cause frequent surging in the level of liquid in the tubes 14. Provision of the trough 50 helps to eliminate this surging and to make operation of the evaporator and circulation of the liquid through the tubes much more uniform. While it has been found highly desirable to eliminate this body of liquid on top of the upper tube sheet 11 by the provision of the depressed trough 50 around the tube sheet, the inner wall of this trough is formed by the tubular shell 10 which is a steam chest and which is at substantially the same temperature as the steam contained by this shell. If the material being handled is at all heat sensitive, as with milk which contains proteins, a coating would form on the exterior of that part of the shell 10 projecting upwardly into the vapor space 29. This coating would gradually burn and be extremely difficult to remove. To avoid the formation of such a coating a frusto-conical baffle plate 51 is provided, the smaller rim of this baffle plate being secured to the upper extremity of the tubular shell 10 and the larger rim of this baffle plate being secured to the ring-shaped plate 25. It will be seen that this baffle plate 51 serves to isolate that portion of the shell 10 which projects upwardly into the vapor space 29 and prevent contact of the liquid therewith. Accordingly even if the liquid is heat sensitive there is no danger of burning this liquid through prolonged contact with the exterior of the shell 10.

The vapor space 29 is divided into two chambers 29a and 29b by a horizontal plate or partition 53 the upper and lower faces of which are engaged by the sealing gaskets 34, 28, respectively, of the cover 30 and cylinder 26. For convenience, this plate 53 is preferably hinged to the shell 26 as indicated at 54. The hinge connection between the plate 53 and the cylindrical shell 26 is shown as comprising an extension 55 (see Fig. 2) from one edge of the plate 53 and which is centrally indented to provide a pair of horizontally extending ears 56. To the underside of each of these ears 56 is welded a downwardly projecting hinge bracket 58. A horizontal hinge pin 60 extends horizontally through these hinge brackets and also through a hinge bracket 61 welded to and projecting outwardly from the shell 26 near its flange 27.

Desirably this partition or plate 53 is also clamped against the sealing gasket 28 and for this purpose a swinging clamping screw, indicated generally at 62, can be provided. Each of these clamps is shown as comprising an eyebolt 63 pivoted to an ear 64 of the flange ring 27 so that this eyebolt can swing through a notch or slot 66 provided in the edge of the partition 53. A wing nut 68 completes the clamp, this wing nut bearing against the upper face of the partition or plate 53 so as to draw it into sealing engagement with the sealing ring 28.

In the form of the invention shown in Figs. 1–5, the present invention in addition to isolating the upper end of the steam heated shell 10 by the baffle 51 as above described, is essentially concerned with the structure contained within the vapor spaces 29a and 29b, particularly the former, and which spaces are primarily so designed as to, first, remove entrained liquid from the vapors passing through this space and, second, to minimize formation of liquid particles in such manner as to reenter the vapor stream as entrained liquid. For this purpose, in the form of the invention shown in Figs. 1–5, the horizontal plate or partition 53 is provided with a relatively large central opening 70, this opening 70 being out of vertical register with the vapor outlet opening 38 of the cover 30.

Around this opening 70 of the plate 53 an annular series of depending hanger rods 71 are fixed, as by welding, to the underside of the plate 53. Each of these hanger rods carries a depending screw 72 which screws upwardly into its lower end. The head of each of these screws supports a short sleeve 73 against the bottom of the corresponding hanger rod 71. These sleeves extend through and are welded in a dome or umbrella-shaped baffle 75.

This dome or umbrella-shaped baffle is circular and comprises a central portion in the form of a shallow funnel or conical portion 76 sloping downwardly to a central opening 78 which connects with a U-shaped tube or trap 79 the discharge end of which is arranged over the tube sheet 11. The sleeves 73 for the hanger rods 71 are welded in this conical portion 76 and beyond these hanger rods the rim of the baffle 75 is bent downwardly to form a depending apron or rim 80. The lower edge of this apron or rim 80 is continued inwardly, as at 81, and thence upwardly, as at 82, to form an annular internal trough 83 around the rim or apron of the umbrella-shaped baffle 75. The liquid collecting in this trough 83 escapes in the form of separate and relatively large or heavy streams through holes 84 in the bottom 81 of this trough. The heavy streams from these holes 84 avoid the formation of droplets or such small or attenuated bodies of liquid as would be picked up and re-enter the vapor stream. The number of such holes 84 varies with the diameter of the trough, these holes being spaced to provide enough free area for vapor to escape past the streams falling from these holes. As previously indicated an important feature of the invention is to avoid so handling the separated liquid as to permit any substantial part to re-enter the vapor as entrained liquid.

A vertical tubular ring 85 is closely fitted in the opening 70 of the horizontal plate or partition 53 and is preferably secured in this opening as by welding. The lower end of this vertical tubular ring 85 is flanged horizontally outwardly, as at 86, and thence upwardly, as at 88, to form an annular external trough 89. The gravity discharge from this trough is in the form of a vertical pipe 90 extending through the bottom 86 of this trough and having its lower discharge end closely adjacent the upper face of the funnel-shaped central part 76 of the umbrella-shaped baffle 75.

The liquid collecting on the upper side of the horizontal partition or plate 53 cannot escape through the opening 70 because of the vertical tubular ring 85 fitting and welded in this opening. Such escape is permitted through a U-shaped tube or trap 91 one leg of which connects with and extends through the horizontal partition or plate 53 and the depressed leg or discharge end of which is arranged over the umbrella-shaped baffle 75.

Above the annular plate or partition 53 a depending baffle or wall indicated generally at 95 is welded to the underside of the cover 30 along its upper edge so as to depend therefrom. In horizontal section this wall or baffle 95 is sinuous being preferably in the form of a crook or question mark having an open sided cylindrical inner portion 96 which is in line with the opening 70 in the circular plate 53. One end 98 of this baffle or wall continues from one end of the open sided cylindrical central part 96 radially to contact the cylindrical side wall 31 of the cover, as well as the top wall 32 thereof, and to which walls it is preferably welded. The opposite end 99 of this central cylindrical portion 96 preferably terminates short of the juncture between the cylindrical and radial portions 96, 98 of the wall so as to provide an opening 100 providing communication between the interior of the cylindrical portion 96 and the space surrounding this cylindrical part. The radial portion 98 of the wall or baffle is arranged between the vapor outlet opening 38 and the opening 100 and it will therefore be seen that the question mark-shaped wall 95 provides a sinuous or volute-shaped passage channel 101 the inner end of which passage is in communication with the opening 70 of the circular plate 53 and the outer end of which is in communication with the opening 38 leading to the vapor discharge elbow 40. In order to confine the vapors to the passage 101 through the full length of this volute-shaped channel 101, the lower edge of the question mark-shaped wall or baffle 95 is preferably provided with a sealing gasket 102 of soft resilient material which, as shown, contacts the upper face of the circular plate 53. It has also been found desirable to have the upper part of the cylindrical portion 96 of the baffle 95 of contracted form. To this end this upper part includes a frusto-conical portion 103 which converges upwardly and joins with a collar 104 of smaller diameter than the base part 96. As previously indicated, this upper part is welded to the inside of the top 32 of the cover 30.

The vapor passes through the volute-shaped passage 101 in the direction of the arrow shown in Fig. 2 and deposits entrained liquid against the internal faces of the side wall 31 and top wall 32 of the cover 30 as well as against the external face of the cylindrical portion 96 of the baffle 95 and the top of the horizontal plate or partition 53. It is a feature of the invention that once collected on any of these walls the liquid is not permitted to re-enter the vapor stream even though the vapor stream is moving at high velocity through the passage 101 and has a pronounced tendency to pick up any stray droplets or attenuated extensions or streams formed from the liquid on these walls.

Thus the liquid flowing along the underside of the top wall 32 encounters one of two collecting and guide troughs 105. The inner end of each of these troughs 105 abuts the cylindrical portion 96 of the separating baffle 95 and these troughs are preferably arranged tangentially with respect to the cylindrical portion 96 or chordally with respect to the cylinder 31 and with its outer end downstream as compared with its inner end. Each trough 105 includes a vertical wall 106 the upper edge of which engages and is secured to the underside of the top wall 32, a bottom flange 108 running the full length of the trough and extending in opposition to the flow of vapor, and a vertical flange 109 along the outboard edge of the bottom flange 108 and completing the trough passage 110. It will be seen that the film of liquid moving along the underside of the top wall 32 of the cover 30 under the influence of the vapor flowing through the passage 101 is intercepted by the troughs 105 and collected in their trough passages 110. Because of the chordal arrangement of these troughs and their slope, this collected liquid is carried along these troughs and deposited on the interior of the cylindrical wall 31 of the cover 30.

A part of the liquid deposited on the interior of the cylindrical wall 31 of the cover 30 flows by gravity down this wall onto the horizontal plate of partition 53. The stream of vapor moves the layer of liquid on this horizontal plate or partition 53 in the direction of the curved arrow shown in Fig. 2 or toward the vapor outlet 39. Immediately under this vapor outlet 39 and the outlet elbow 40 a horizontal shelf 115 extends across the passage 101 a short distance above the horizontal plate or partition 53. The opposite side edges of this shelf connect with the opposing faces of the cylindrical wall 31 of the cover 30 and the cylindrical portion 96 of the baffle 95, respectively. A third edge of this shelf 115 connects with the radial portion 98 of the baffle 95. The fourth edge opposes the direction of flow of the vapor and forms a pocket 116 which opens in opposition to the direction of flow of the vapor. As a result the layer of liquid on the top of the horizontal plate or baffle 53, and which represents the preponderance of the collected liquid, is swept by the stream of vapor into this pocket 116. This pocket encloses the inlet to the U-shaped discharge pipe or trap 91 and hence this collected liquid flows through this trap onto the umbrella-shaped baffle 75. In order to catch that part of the film of liquid which travels around the vertical cylindrical wall 31 to the shelf 115, a vertical pocket, indicated at 120, is provided which catches this liquid and directs it into the horizontal pocket 116 under the shelf 115. As previously indicated, the greater part of the film of liquid which forms on this cylindrical wall 31 descends by gravity to the horizontal plate or partition 53.

The pocket 120 is formed by an L-shaped piece of sheet metal having a flange 121 which forms the back of the pocket and a flange 122 which forms the inner side of the pocket. The edge of the flange 121 is secured to the wall 31 above the leading edge of the shelf 115 and desirably this flange slopes downwardly and in a clockwise direction as viewed in Fig. 2. This flange 121 spaces the flange 122 from the wall 31 and forms the pocket 120 to catch the moving film of liquid on the wall 31 and direct it downwardly onto the shelf 115 but still trapped by the flanges 121, 122. To drain this collected liquid a hole 123 is shown as provided in the shelf 115 within the pocket 120.

A similar vertical pocket 125 is provided for catching the film of liquid traveling clockwise around the exterior of the cylindrical part 96 of the baffle 95 under the influence of the stream of vapor which is also traveling clockwise as shown by the curved arrow in Fig. 2. The vertical pocket 125 is formed by an L-shaped piece of metal having a flange 126 which forms the back of the pocket and a flange 128 which forms the side of the pocket. The edge of the flange 126 is secured to the cylindrical wall 96 above the leading edge of the shelf 115 and desirably this flange slopes downwardly and in a clockwise direction as viewed in Fig. 2. This flange 126 spaces the flange 128 from the wall 96 and forms the pocket 125 to catch the moving film of liquid on the wall 96 and direct it downwardly onto the shelf 115 but still trapped by the flanges 126, 128. To drain this collected liquid a hole 129 is shown as provided in the shelf 115 within the pocket 120.

In the operation of the evaporator as above described, the liquid to be concentrated is admitted to the liquid chamber 24 from a supply line 23 so as to maintain a liquid body, as shown, in this liquid chamber 24, the tubes 14 and the return leg 42 at approximately the level indicated. This body is continuously being concentrated and the concentrated liquid flows out through the outlet line 45.

The concentration is effected by the admission of steam from the steam supply line 18 to the steam chest 15. This steam heats the tubes 14 at such temperature as to cause the rapid evolution of vapor within these tubes and which vapor, together with a large quantity of the liquid to be condensed, is projected upwardly or geysers from the upper ends of the tubes 14. This liquid strikes the conical or funnel shaped central part 76 of the dome or umbrella-shaped baffle 75 and which spreads the liquid laterally outwardly and discharges it against the depending flange or apron 80 which forms the rim of this dome-shaped baffle 75. This liquid is projected down this skirt or apron 80 into the annular internal trough or channel 83 from which it escapes in the form of relatively heavy streams through the holes 84 in the bottom of this trough. These streams discharge downwardly onto the frusto-conical baffle or plate 51 which leads this liquid into the channel 50 which is depressed with reference to the tube sheet 11 and in part formed by the frusto-conical baffle 51. From this annular channel 50 the liquid flows back through the return leg 42 to the body of liquid in the liquid chamber 24.

It will be noted that three objectives of the invention are achieved during the above described movement of the liquid. In the first place there is no tendency for a body of liquid to build up on the upper tube sheet 11 as has been the case heretofore. This is due to the fact that this tube sheet is surrounded by the depressed annular trough 50 so that any liquid tending to remain on this tube sheet flows off into this trough 50 and immediately returns through the return leg 42. Such body of liquid collecting and remaining on the tube sheet 11 impeded the geysering of the liquid and vapor from the tubes 14 and also caused the generation of fine droplets or bodies of liquid which tended to remain as entrained liquid in the vapor. The second effect of the above described movement of the liquid is that there is no tendency for the liquid to cake on the hot exterior surfaces of the steam chest because of prolonged contact therewith. Thus the liquid immediately drains from or is projected upwardly from the top of the tube sheet 11 and this liquid cannot contact the exterior of the shell 10 of the steam chest because of the frusto-conical baffle or wall 51 which prevents such contact. The prevention of such contact is highly important where the materials are heat sensitive and would have a tendency to cake and bake upon the exterior of the steam chest 10 were this not prevented by the frusto-conical partition or wall 51. The third objective achieved by the above flow of liquid is that the liquid striking the dome or umbrella-shaped baffle 75 is not released from this baffle in the form of attenuated sheets but in the form of heavy streams or drops issuing from the holes 84.

The purpose of the dome or umbrella-shaped baffle 75 is both to separate the liquid from the upwardly flowing vapor and to collect the separated liquid and return the separated liquid downwardly. The separating action is one of converting the high velocity flow of the mixture of vapor and liquid in an upward direction into the downward flow of the liquid and at the same time leaving the largest possibel free or unobstructed area for the vapors to move upwardly so as to pick up or entrain as little as possible of the separated liquid being returned by the umbrella-shaped baffle. It has been found that any umbrella-shaped baffle equipped with a ring or skirt similar to 80 will effectively reverse the direction of flow of the separated liquid with reference to the mixture of vapor and liquid but the liquid falling from such a baffle would be in the form of a more or less solid sheet or curtain through which the vapors must break to pass around the baffle. In so breaking through such a curtain a considerable amount of liquid is entrained or picked up by the vapors in the form of small drops.

By collecting the liquid in the annular trough 83 and releasing the liquid as distinct, definitely defined streams through the holes 84, a free or unobstructed space for the flow of vapor is formed, which space is large as compared to the face area of the streams so that there is a very limited contact between the returning liquid and the vapor. This trough and release of the returned liquid as distinct, separate streams thereby permits higher velocities of the vapor than would otherwise be possible and hence permits of the use of a smaller size separator in relation to the size of the steam chest.

Part of the liquid projected upwardly from the tubes 14 strikes the inside face of the wall 82 of the trough 83. This liquid flows down this wall, along the outside of the bottom 81 of the trough and either joins the streams of liquid having the holes 84 or drops off at the annular edge between the walls 82 and 81 in the form of pencil streams. This is a very small amount of liquid as compared with that collected in the trough 83 and is not large enough in quantity to form a solid sheet but necessarily breaks up into pencil streams. Enough free space is provided among these pencil streams and the larger streams from the holes 84 for the vapor to flow through without picking up or entraining any substantial quantity of the returning liquid. If any liquid is picked up or entrained by the vapor it will be removed from the vapor before the vapor leaves the evaporator.

This stream of vapor is deflected radially outwardly by the dome or umbrella-shaped baffle 75 and escapes upwardly through the space between this dome or umbrella-shaped baffle 75 and the cylinder 26. From there this vapor travels inwardly toward the axis of the apparatus and escapes through the sleeve 85 which is fitted in the opening 70 through the horizontal partition or plate 53. In this travel a quantity of the liquid is deposited against the inner face of the cylinder 26. This liquid flows downwardly into the annular trough 50 where it rejoins the liquid flowing through the return leg 42 to the liquid chamber 24.

Another part of this entrained liquid collects on the underside of the horizontal partition or plate 53 and also against the exterior of the downwardly projected part of the tubular sleeve 85. The liquid collecting on the underside of the partition 53 flows towards its center under the influence of the vapor flowing in that direction and any liquid collecting on the exterior of the downwardly projected part of the tube or sleeve 85 and enters the annular trough 89. From this trough the liquid passes through the drain tube 90 into the central funnel-shaped part 76 of the umbrella or dome-shaped baffle 75. This liquid collects at the center of this funnel-shaped central part 76 and escapes through the U-shaped trap 79 from which it is picked up by the liquid geysering from the upper ends of the tubes 14. Any liquid collecting on the hanger rods 71 and on the upper face of the umbrella-shaped baffle 75, of course, joins the liquid flowing down the central funnel-shaped part 76 of this baffle and out through the U-shaped tube or trap 79 as above described.

The vapor then enters the cylindrical part 96 of the question mark-shaped baffle 95, this being the beginning of the sinuous or volute-shaped path 101 leading to the vapor outlet 49. In so flowing upwardly from the sleeve 85 in the opening 70 a part of the entrained liquid is projected against the underside of the cover 30 due to the change in direction of the stream of vapor in traversing the passage 101. The vapor then passes along this path flowing through the opening 100 into the space between the cylindrical portion 96 of the question mark-shaped baffle 95 and the cover 30 and cylindrical wall 31, the bottom of this space being enclosed by the circular partition or plate 53 and sealing strip 102. The flow through this passage 101 is clockwise as viewed in Fig. 2 and in flowing through this volute-shaped channel 101, substantially all of the liquid still remaining in this vapor is discharged principally by centrifugal force against the surrounding cylindrical wall 31. The greater part of this liquid flows downwardly along the inner face of the cylindrical wall 31 on to the horizontal plate or partition 53. As previously described, all of the liquid collecting on this horizontal plate or partition 53 escapes through the U-shaped pipe or trap 91 which discharges this liquid onto the central funnel-shaped part 76 of the dome or umbrella-shaped baffle 75 to join the liquid already collected thereon.

As previously indicated, a part of liquid collects on the underside of the dome-shaped top wall 32 of the cover 30. Since the vapor in the passage 101 is traveling clockwise as viewed in Fig. 2 and at relatively high velocity, the film of liquid so collecting on the underside of this dome-shaped top wall 32 is moved in a clockwise direction as viewed in Fig. 2 and toward the collecting channels or troughs 105. These channels or troughs are secured to the underside of the dome-shaped top wall 32 of the cover so as to block and hence collect all of the liquid traveling toward them along the underside of the cover and these troughs extend in a chordal direction and also slope downwardly toward the cylindrical wall 31 of the cover so that the liquid collected therefrom is discharged against the inner face of this cylindrical wall 31 to return in the manner previously described.

That part of the liquid film on the inner face of the cylindrical wall 31 of the cover which does not flow down on to the horizontal plate or partition 53 is carried in a clockwise direction, as viewed in Fig. 2, into the vertical pocket, 120. This pocket catches this liquid and through the slope of its back wall 121 directs it downwardly onto the horizontal shelf 115. This liquid thence escapes through the hole 123 into the horizontal pocket 116 formed by the horizontal shelf 115 where this liquid joins the liquid flowing along the horizontal plate or partition 53 into this pocket 116 and escapes therewith through the U-shaped trough or trap 91 as previously described.

A part of the liquid collecting on the exterior of the cylindrical part 96 of the baffle 95 flows downwardly to join the liquid collecting on the horizontal plate 53 to escape as previously described. Such liquid on the exterior of this cylindrical part 96 of the baffle 95 as does not flow downwardly in this manner is caught by the vertical pocket 125. The sloping rear wall 126 of this pocket 125 directs this liquid downwardly on to the shelf 115 from which it escapes through the opening 129 to join the other liquid escaping through the horizontal pocket 116 under this shelf 115.

The vapor escapes through the elbow 40 and by reason of the substantially complete removal of the entrained liquid as previously described, and particularly by reason of the structures provided to prevent regeneration of entrained liquid from the liquid already separated from the vapors, a separator of a given size has a high capacity so that the stream of vapor can be discharged from the apparatus at a high rate of speed. This efficient separation of vapor and liquid permits higher velocities in the separator and the use of a smaller separator for a given size steam chest.

It will also be noted that the structure of the separator is readliy accessible for inspection and cleaning. Especially where evaporators are used for food products it is important that they be readily kept in a clean and sanitary condition. It will particularly be noted that the cover 30 is relatively light in weight and when removed exposes its interior, as well as the entire question mark-shaped baffle 95, troughs 105 and pockets 116, 120 and 125 for ready cleaning. It will also be noted that the horizontal plate or partition 53 can readily be swung up on its hinge 60 and that when so swung the U-shaped pipes or traps 91, 79, as well as all parts of the umbrella-shaped partition 75 and its hangers 71 are conveniently exposed for ready cleaning. It will also be noted that when this horizontal plate or partition 53 is so swung up the entire interior of the vapor chamber 29a, as well as the upper ends of the tubes 14 are exposed for easy cleanability.

It has been found that the entrained liquid is essentially removed by the umbrella-shaped baffle and that the form of the invention shown in Fig. 6, in which the sinuous horizontal path for the vapors in dome for the evaporator shell is eliminated, is very effective in separating the liquid from the vapor and in preventing the loss of liquid through the vapor outlet. In the form of the invention shown in Fig. 6, the numeral 135 designates the vertical tubular shell of the evaporator which is shown as having an internal ring 136 welded internally around its upper rim and as also being welded to a horizontal circular plate 138. This circular plate 138 is provided with an internal circular hole 139 of smaller diameter than the internal diameter of the shell 135 and so as to provide an inwardly projecting circular spacing flange 140 in the mouth of the shell 135.

A vertical cylinder 141 of considerably larger diameter than the shell 135 has a cylindrical side wall 142 and a circular bottom wall which rests on the plate 138 and is provided with a concentric upwardly projecting neck 143 at its center. A continuous seam weld 144 can be provided between the base of this neck 143 and the circular plate 138 and the internal diameter of this neck 143 is of larger diameter than the central opening in the circular plate 138. In the upper end of the neck 143 is welded a circular tube sheet 145, this tube sheet being provided with a plurality of openings in which the upper ends of vertical tubes 146 are severally inserted and secured as by expanding the tubes in place. The space around these tubes 146 constitutes a steam space or chest 148.

An important feature of the invention is that the upwardly projecting neck 143 is insulated from the steam in the steam chest 148. To this end a cylindrical sleeve 149 is fitted and welded in the opening 139 in the circular horizontal plate 138 and projects upwardly into engagement with the under face of the tube sheet 145 to which it is welded. An internal reinforcing ring 150 is also shown as provided around the upper end of the insulating sleeve 149.

A flange ring 151 is welded around the upper rim of the cylinder 141. This flange ring supports a circular sealing gasket 152 of soft material. This gasket supports the flange ring 153 welded around the lower rim of a dome indicated generally at 154. This dome can be of any suitable form and is shown as having a laterally extending vapor outlet 155.

The numeral 161 represents one or more internal brackets provided in the cylinder 141 and projecting inwardly from one side thereof. Each of these brackets carries a pivot pin 162, the pivot pins 162 being in axial horizontal alinement. On the opposite side the cylinder 141 is provided with one or more internal brackets 165 each of which carries a horizontal wing bolt 166.

The numeral 168 represents a dome or umbrella-shaped baffle including an upwardly dished central part 169 and a cylindrical rim part 170. The central upwardly dished part 169 is welded within the cylindrical rim part 170 intermediate the upper and lower edges of the latter so as to form an annular trough 171 around the rim of the upwardly dished central part 169 and so as to form a skirt depending from this rim of the upwardly dished central part 169. The lower edge of this skirt is extended horizontally inwardly and thence upwardly to provide an annular internal trough 172 around the rim or apron 170 of the umbrella-shaped baffle 168. Liquid collecting on the upwardly dished central part 169 flows down to the trough 171 at the rim thereof. This trough is provided with an annular series of spaced drain holes 173 through which this liquid passes to the internal trough 172. The bottom of this internal trough 172 is provided with a series of drain holes 174. The number of such holes 174 varies with the diameter of the trough, these holes being spaced to provide enough free area for vapor to escape past the streams falling from these holes.

At one side the dome or umbrella-shaped baffle 168 has one or more outwardly projecting brackets 175 severally arranged alongside the corresponding brackets 161. Each of the brackets 175 is horizontally slotted from one end thereof, as indicated at 176, to receive the corresponding pivot pin 162. At the other side the dome or umbrella-shaped baffle 168 has one or more outwardly projecting brackets 178 severally arranged alongside the corresponding brackets 165. Each of the brackets 178 is slotted vertically from the lower edge thereof, as indicated at 179, to receive the shank of the corresponding wing bolt 166. After the wing bolts 166 are loosened, the dome or umbrella-shaped baffle can be swung up about its pivot pins 162 by the use of a handle or handles 180 at the side of the baffle opposite its pivot brackets 175.

The upwardly projecting neck 143 forms a deep annular channel 181 which surrounds the elevated end of the steam chest 148. The liquid collecting in this annular channel is immediately returned through a return leg 182 to the main body of liquid which is maintained at a predetermined level in the tubes 146 in the same manner as with the form of the invention shown in Figs. 1–5.

As with the form of the invention shown in Figs. 1–5, in the operation of the form shown in Fig. 6, the body of the liquid to be concentrated is maintained within the tubes 146. The concentration is effected by the admission of steam to the steam chest 148. The steam heats the tubes 146 to such temperature as to cause the rapid evolution of vapor within these tubes from the liquid therein and this vapor, together with a large quantity of the liquid to be condensed, is projected upwardly or geysers from the upper ends of the tubes 146. This geysering liquid strikes the underside of the upwardly dished central part 169 of the dome or umbrella-shaped baffle 168 which spreads the liquid laterally outwardly and discharges it against the depending flanges or apron 170 which forms the rim of this dome-shaped baffle 168. This liquid is projected down this skirt or apron 170 into the internal annular trough or channel 172 from which trough it escapes in the form of relatively heavy streams through the holes 174 in the bottom of this trough. These streams discharge downwardly into the large annular channel or trough 181 and since these streams are separated from one another the vapor being discharged from the tubes 146 can readily escape past these heavy streams. This liquid flowing as streams from the holes 174 flows from the trough or channel 181 through the liquid return leg 182 to the body of liquid supplying the tubes 146.

It will be noted that in this flow of liquid there is no tendency for a body of liquid to build up on the upper tube sheet 145 as has been the case heretofore. As with the form of invention shown in Figs. 1–5, this is due to the fact that this tube sheet is surrounded by the depressed annular trough 181 so that no liquid tends to remain on this tube sheet but flows off into this trough and immediately returns through the return leg 182. Such body of liquid collecting on the tube sheet 145 in evaporators as heretofore constructed impeded the geysering of the liquid and vapor from the tubes 146, and also caused the generation of fine droplets or bodies of liquid which tended to remain as entrained liquid in the vapor. The second effect of the evaporator as constructed in Fig. 6 is that there is no tendency for the liquid to cake on the hot exterior of the steam chest because of prolonged contact therewith. Thus, the liquid immediately drains from or is projected upwardly from the top of the tube sheet 145 and also liquid cannot contact the exterior of the cylindrical sleeve 149 or the adjacent part of the circular plate 140 of the steam chest because the spaced neck 143 prevents such contact. The prevention of such contact is highly important where the materials are heat sensitive and would have a tendency to cake and bake on the exterior of the steam chest 148 were this not prevented by the spaced insulating wall or neck 143.

As with the form of the invention shown in Figs. 1–5, another effect of the above described flow of liquid is that the liquid striking the dome or umbrella-shaped baffle 168 is not released from this baffle in the form of attenuated sheets but in the form of heavy streams or drops issuing from the holes 174. The umbrella-shaped baffle 168 separates the liquid from the vapor and collects the separated liquid to return it as heavy streams or drops, thereby leaving a large unobstructed free area for the upwardly moving vapor and to reduce to a minimum any tendency for these vapors to pick up liquid from that being returned by the baffle. The ring or skirt 170 effectively directs the liquid downwardly, but without the trough 172 the liquid so returned would be in the form of a more or less solid sheet or curtain through which the vapors would be required to break in order to get around the baffle. In so breaking through such a curtain a considerable amount of liquid would be picked up by the vapor and by collecting this liquid in the trough 172 and releasing this liquid as definitely defined heavy streams or drops through the holes 174, a large free or unobstructed space is left for the vapor so that the vapor can pass at a relatively high velocity, thereby to permit of the use of a smaller size separator as compared with the steam chest 148.

The dome or umbrella-shaped baffle serves, of course, to divert the vapors horizontally and then abruptly upwardly. In making this upward turn entrained liquid particles in the vapor tend to strike the inside face of the cylinder 142 from which this collected liquid flows downwardly into the large annular trough 181 to rejoin the liquid returning through the return leg 182.

Any liquid tending to collect on top of the dome-shaped circular part 169 of the umbrella-shaped baffle 168 will flow towards its trough 171 to return through the holes 173 to the trough 172 and thence to the trough 181.

It has been found that the umbrella-shaped baffle structure as shown in Fig. 6 has been remarkably effective in obtaining separation of the liquid from the vapor so that substantially no entrained liquid is carried out through the vapor outlet 155. If loss of entrained liquid through the outlet 155 were experienced with some liquids it would be possible to reduce this, of course, by placing a suitable baffle (not shown) across the inlet of the vapor outlet 155; to use the plate 53 as with the form of the invention shown in Figs. 1–5; or to include the complete upper baffle structure in the chamber 29b of the form of the invention shown in Figs. 1–5.

When it is desired to clean the upper part of the evaporator as shown in Fig. 6, all that is necessary is to remove the dome 154 following which the wing bolts 166 can be loosened. By lifting the handle 180 the entire dome or umbrella-shaped baffle 168 can then be swung up, pivoting about the pivot pins 162. The baffle can then be lifted completely out, this being permitted by the slots 176 which are, in effect, half bearings for the pivot pins 162. The entire interior of the upper chamber of the separator can then be cleaned as well, of course, as the removed umbrella-shaped baffle 168.

From the foregoing it will be seen that the present invention provides a very compact and effective form of vapor-liquid separator which is contained within the vapor space at the top of an evaporator so as to avoid the necessity for a separator alongside the evaporator; which is highly effective in its separating action; which is so constructed as to avoid the regeneration into entrained liquid of once separated liquid; which avoids the the danger of caking or baking of heat materials on high temperature surfaces; and which is readily accessible for cleaning when required.

We claim:

1. In an evaporator or the like having an enclosed vapor space formed principally by a vertical tubular side wall open at its upper end, a dome-shaped removable cover enclosing the upper end of said tubular side wall and having a vapor outlet, a generally horizontal tube sheet in the central lower part of said tubular side wall and means providing a trough between said tube sheet and tubular side wall and which trough is depressed with reference to said tube sheet, said evaporator also including a plurality of vertical tubes connected with and extending downwardly from said tube sheet and severally communicating with openings in said tube sheet, means arranged to supply the liquid to be evaporated to the interior of said tubes, means arranged to heat the exterior of said tubes to effect vaporization of the liquid therein and the discharge of streams of vapor and liquid upwardly into the central part of said vapor space and means arranged to drain the liquid from said trough to said supplying means; the combination therewith of means for preventing liquid from becoming entrained in the vapor passing through said vapor space comprising a horizontally disposed umbrella-shaped baffle in said vapor space, said baffle being dome shaped to arch upwardly toward its center, means arranged to support said baffle in spaced relation to the internal vertical surfaces of said tubular side wall and with one face arranged in opposition to said streams of vapor and liquid from said tubes whereby said streams are deflected horizontally along the under surface of said baffle, a generally vertical apron depending from the periphery of said baffle, said apron projecting upwardly from the periphery of said baffle to form a trough around said periphery, an internal trough along the lower edge of said apron to collect said horizontally deflected liquid, and means providing a drain for each of said troughs.

2. A structure as set forth in claim 1 wherein said drain for said trough around said periphery is in the form of a hole in said periphery above said internal trough.

References Cited in the file of this patent

UNITED STATES PATENTS

| | | |
|---|---|---|
| 28,272 | Hitchings | May 15, 1860 |
| 551,161 | Gaiennie | Dec. 10, 1895 |
| 934,727 | Hylander | Sept. 21, 1909 |
| 989,996 | Parker | Apr. 18, 1911 |
| 1,168,758 | Stade | Jan. 18, 1916 |
| 1,802,942 | Govers | Apr. 28, 1931 |
| 2,129,490 | Buchs | Sept. 6, 1938 |

FOREIGN PATENTS

| | | |
|---|---|---|
| 28,925 | Great Britain | 1910 |